US006940253B2

(12) United States Patent
Hinkkanen

(10) Patent No.: US 6,940,253 B2
(45) Date of Patent: Sep. 6, 2005

(54) METHOD IN CONNECTION WITH SENSORLESS INDUCTION MOTORS

(75) Inventor: Marko Hinkkanen, Espoo (FI)

(73) Assignee: ABB Oy, Helsinki (FI)

( * ) Notice: Subject to any disclaimer, the term of this patent is extended or adjusted under 35 U.S.C. 154(b) by 23 days.

(21) Appl. No.: 10/497,460

(22) PCT Filed: Oct. 17, 2003

(86) PCT No.: PCT/FI03/00775

§ 371 (c)(1), (2), (4) Date: Jun. 2, 2004

(87) PCT Pub. No.: WO2004/036732

PCT Pub. Date: Apr. 29, 2004

(65) Prior Publication Data

US 2005/0001583 A1 Jan. 6, 2005

(30) Foreign Application Priority Data

Oct. 18, 2002 (FI) .............................. 20021865

(51) Int. Cl.$^7$ .............................................. H02P 21/00
(52) U.S. Cl. ..................... 318/804; 318/803; 318/807
(58) Field of Search .................... 318/727, 798–804, 318/807–811

(56) References Cited

U.S. PATENT DOCUMENTS

| | | | | |
|---|---|---|---|---|
| 4,088,934 A | * | 5/1978 | D'Atre et al. ............. 318/802 |
| 5,334,923 A | * | 8/1994 | Lorenz et al. ............. 318/805 |
| 5,448,150 A | * | 9/1995 | Yamamoto et al. ........ 318/805 |
| 6,037,742 A | * | 3/2000 | Rasmussen ................ 318/807 |
| 6,094,364 A | * | 7/2000 | Heikkila .................... 363/41 |
| 6,281,659 B1 | | 8/2001 | Giuseppe ................... 318/799 |
| 6,377,018 B2 | | 4/2002 | Tajima et al. .............. 318/727 |
| 6,518,722 B1 | * | 2/2003 | Giuseppe ................... 318/727 |
| 6,594,592 B1 | * | 7/2003 | Griepentrog et al. ....... 702/41 |
| 2001/0043048 A1 | | 11/2001 | Tajima et al. | |

FOREIGN PATENT DOCUMENTS

EP 0 921 632 6/1999 .......... H02P/21/00

OTHER PUBLICATIONS

Griva G. et al., "High performance sensorless control of induction motor drives for industry applications." Proceedings of the Power Conversion Conference–Nagaoka 1977, New York, NY, USA, IEEE, USA, vol. 2, pp. 535–539.

H. Kubota, K. Matsuse, and T. Nakano, "DSP–based speed adaptive flux observer of induction motor," IEEE Transactions on Industry Applications, vol. 29, no. 2, pp. 344–348, Mar./Apr. 1993.

G. Yang and T. H. Chin, "Adaptive–speed identification scheme for a vector–controlled speed sensorless inverter–induction motor drive," IEEE Transactions on Industry Applications, vol. 29, no. 4, pp. 820–825, Jul./Aug. 1993.

(Continued)

*Primary Examiner*—Bentsu Ro
(74) *Attorney, Agent, or Firm*—Dykema Gossett PLLC

(57) ABSTRACT

A method for the stabilization of full-order flux observers for speed-sensorless induction motors in the regenerative mode. The method comprises determining the current vector of the induction motor, determining the stator voltage vector of the induction motor, forming a full-order flux observer having a system matrix (A) and a gain matrix (L), the state-variable observer being augmented with a speed adaptation loop, and producing an estimated rotor flux linkage vector and an estimated stator current vector, determining an estimation error of the stator current vector, defining a correction angle, and forming a speed adapt-tion law based on the cross product of the estimation error of the stator current vector and the estimated rotor flux linkage vector, where the correction angle is used to turn the rotor flux linkage vector or the estimation error of the stator current vector in order to keep the observer stable.

2 Claims, 4 Drawing Sheets

OTHER PUBLICATIONS

S. Suwankawin and S. Sangwongwanich, "A speed–sensorless IM drive with decoupling control and stability analysis of speed estimation," IEEE Transactions on Industrial Electronics, vol. 49, no. 2, pp. 444–455, Apr. 2002.

H. Tajima, G. Guidi, and H. Umida, "Consideration about problems and solutions of speed estimation method and parameter tuning for speed sensorless vector control of induction motor drives," in Conference Record of the IEEE Industry Applications Conference, Thirty–Fifth IAS Annual Meeting, Rome, Italy, Oct. 2000, vol. 3, pp. 1787–1793.

H. Kubota, I. Sato, Y Tamura, K. Matsuse, H. Ohta, and Y. Hori, "Regenerating–mode low–speed operation of sensorless induction motor drive with adaptive observer," IEEE Transactions on Industry Applications, vol. 38, no. 4, pp. 1081–1086, 2002.

R. Ottersten and L. Harnefors, "Design and analysis of inherently sensorless rotor–flux–oriented vector control system," in Nordic Workshop on Power and Industrial Electronics (NORPIE/2002), Stockholm, Sweden, Aug. 2002.

C. Nitayotan and S. Sangwongwanich, "A filtered back EMF based speed–sensorless induction motor drive," in Conference Record of the IEEE Industry Applications Conference, Thirty–Sixth IAS Annual Meeting, Chicago, IL, Sep./Oct. 2001, vol. 2, pp. 1224–1231.

J. Maes and J.A. Melkebeek, "Speed–sensorless direct torque control of induction motors using an adaptive flux observer," IEEE Transactions on Industry Applications, vol. 36, no. 3, pp. 778–785, May/Jun. 2000.

B. Peterson, Induction machine speed estimation—observations on observers, Ph.D. thesis, Department of Industrial Electrical Engineering and Automation, Lund University, Lund, Sweden, Feb. 1996.

M. Hinkkanen and J. Luomi, "Digital implementation of full–order flux observers for induction motors," in 10th International Power Electronics and Motion Control Conference (EPE–PEMC'02), Cavtat & Dubrovnik, Croatia, Sep. 2002.

M. Hinkkanen, "Analysis and design of full–order flux observers for sensorless induction motors," in The 28th Annual Conference of the IEEE Industrial Electronics Society (IECON'02), Sevilla, Spain, Nov. 2002, in press.

F. Briz, M.W. Degner, and R.D. Lorenz, "Analysis and design of current regulators using complex vectors," IEEE Transactions on Industry Ap–plications, vol. 36, no. 3, pp. 817–825, May/Jun. 2000.

J.K. Pedersen, F. Blaabjerg, J.W. Jensen, and P Thogersen, "An ideal PWM–VSI inverter with feedforward and feedback compensation," in Fifth European Conference on Power Electronics and Applications (EPE'93), Brighton, U.K., Sep. 1993, vol. 4, pp. 312–318.

* cited by examiner

METHOD IN CONNECTION WITH SENSORLESS INDUCTION MOTORS

FIELD OF THE INVENTION

The present invention relates to use a of full-order flux observers, and particularly to stabilization of the full-order flux observers for speed-sensorless induction motors in the regenerative mode.

BACKGROUND OF THE INVENTION

Speed-sensorless induction motor drives have developed significantly during the past few years. Speed-adaptive full-order flux observers are promising flux estimators for induction motor drives. The speed-adaptive observer consists of a state-variable observer augmented with a speed-adaptation loop. The observer gain and the speed-adaptation law determine the observer dynamics.

The conventional speed-adaptation law was originally derived using the Lyapunov stability theorem or the Popov hyperstability theorem. However, the stability of the adaptation law is not guaranteed since, controversial assumptions regarding nonmeasurable states have been used in and the positive-realness condition is not satisfied in. An unstable region encountered in the regenerating mode at low speeds is well known. The regenerating-mode low-speed operation is problematic also for the estimators based on the voltage model as shown in.

In the case of the speed-adaptive full-order flux observer, the size of the unstable region could be reduced or, in theory, even removed by choosing the observer gain suitably. However, based on the simulations carried out, the methods and are sensitive to very small errors in the motor parameters. Furthermore, a seamless transition from the regenerating-mode low-speed operation to higher-speed operation or motoring-mode operation may be problematic.

Another approach to remedy the instability is to modify the speed-adaptation law. This approach seems to be almost unexplored. In changing the direction of the error projection of the adaptation law was discussed (but not Studied) for a filtered back-emf-based observer. In the rotor flux estimate included in the adaptation law was replaced with the stator flux estimate, but this does not remove the unstable region.

BRIEF DESCRIPTION OF THE INVENTION

An object of the present invention is to provide a method so as to solve the above problem. The object of the invention is achieved by a method, which is characterized by what is stated in the independent claim. The preferred embodiments of the invention are disclosed in the dependent claims.

The method of the invention is based on a modified speed-adaptation law where the direction of the error projection is changed in the regenerating-mode low-speed operation. Thus instead of using only the current estimation error perpendicular to the estimated flux, the parallel component is also exploited in the regenerating mode.

An advantage of the method of the invention is that the control of sensorless induction motor will be stabile in all operating points including low-speed regeneration. The control of an induction motor based on the method of the invention is fast to implement and reliable.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
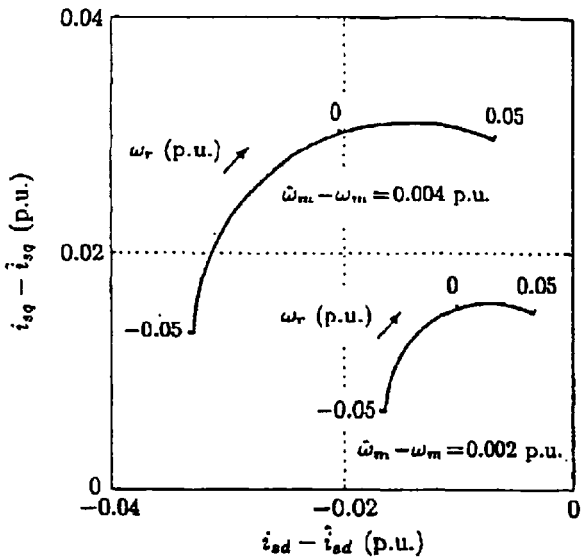
FIGS. 1 and 2 illustrate loci of the current estimation error.

In the description the induction motor model and the speed-adaptive flux observer are first defined. Then, steady-state analysis is used to clarify the problem underlying the invention and its solution according to the invention. The stability is also studied by using root loci of the linearized system. Finally, after describing a control system based on the rotor flux orientation, simulation and experimental results are presented.

Induction Motor Model

The parameters of the dynamic Γ-equivalent circuit of an induction motor are the stator resistance $R_s$, the rotor resistance $R_R$, the stator transient inductance $L'_s$, and the magnetizing inductance $L_M$. The angular speed of the rotor is denoted by $\omega_m$, the angular speed of the reference frame $\omega_k$, the stator current space vector is $\underline{i}_s$, and the stator voltage $\underline{u}_s$. When the stator flux $\underline{\psi}_s$ and the rotor flux $\underline{\psi}_R$ are chosen as state variables, the state-space representation of the induction motor becomes $$\dot{X} = \underbrace{\begin{bmatrix} -\dfrac{1}{\tau'_s} - j\omega_k & \dfrac{1}{\tau'_s} \\ \dfrac{1-\sigma}{\tau'_r} & -\dfrac{1}{\tau'_r} - j(\omega_k - \omega_m) \end{bmatrix}}_{A} X + \underbrace{\begin{bmatrix} 1 \\ 0 \end{bmatrix}}_{B} \underline{u}_s \quad (1a)$$

$$\underline{i}_s = \underbrace{\begin{bmatrix} \dfrac{1}{L'_s} & -\dfrac{1}{L'_s} \end{bmatrix}}_{C} X \quad (1b)$$

where the state vector is $\underline{X} = [\underline{\psi}_s \; \underline{\psi}_R]^T$, and the parameters expressed in terms of the Γ-equivalent circuit parameters are $\sigma = L'_s/(L_M + L'_s)$, $\tau'_s = L'_s/R_s$, and $\tau'_r = \sigma L_M/R_R$. The electromagnetic torque is $$T_e = \dfrac{3}{2} p \, \text{Im}\{\underline{i}_s \underline{\psi}_R^*\} = \dfrac{3}{2} p \dfrac{1}{L'_s} \text{Im}\{\underline{\psi}_s \underline{\psi}_R^*\} \quad (2)$$

where p is the number of pole pairs and the complex conjugates are marked by the symbol *. In the specification, the parameters of a 2.2-kW four-pole induction motor given in Table I are used. It should also be understood that these parameters are used only for explaining the invention.

The method according to the invention comprises determining the current vector of the induction motor and determining the stator voltage vector of the induction motor. The current vector is obtained, for example, by measuring the currents. In a three-phase system it is usually necessary to measure only two currents.

The voltage vector is obtained, for example, by measuring the voltage in the apparatus feeding the motor. The apparatus is usually a frequency converter with a direct voltage intermediate circuit. By measuring this voltage and combining it with state information of the output switches, the output voltage vector is achieved.

Speed-Adaptive Full-Order Flux Observer

Conventionally, the stator current and the rotor flux are used as state variables in full-order flux observers. However, choosing the stator and rotor fluxes as state variables is preferred since this allows the observer to be used with stator-flux-oriented control or direct torque control [8] as well as with rotor-flux-oriented control. Consequently, the full-order flux observer is defined by $$\dot{\hat{X}} = \hat{A}\hat{X} + Bu_s + L(\underline{i}_s - \hat{\underline{i}}_s) \quad (3a)$$

$$\hat{\underline{i}}_s = C\hat{X} \quad (3b)$$

where the observer state vector is $\hat{X} = [\hat{\underline{\psi}}_s \ \hat{\underline{\psi}}_R]^T$, and the system matrix and the observer gain are $$\hat{A} = \begin{bmatrix} -\frac{1}{\tau'_s} - j\omega_k & \frac{1}{\tau'_s} \\ \frac{1-\sigma}{\tau'_r} & -\frac{1}{\tau'_r} - j(\omega_k - \hat{\omega}_m) \end{bmatrix}, L = \begin{bmatrix} \underline{L}_s \\ \underline{L}_r \end{bmatrix} \quad (3c)$$

respectively, where the estimates are marked by the symbol $\hat{}$.

Observer Gain

The simple observer gain $$\underline{L}_s = \lambda[1+j\text{sgn}(\hat{\omega}_m)], \underline{L}_r = \lambda[-1+j\text{sgn}(\hat{\omega}_m)] \quad (4a)$$

where $$\lambda = \begin{cases} \lambda' \frac{|\hat{\omega}_m|}{\omega_\lambda} & \text{if } |\hat{\omega}_m| < \omega_\lambda \\ \lambda' & \text{if } |\hat{\omega}_m| \geq \omega_\lambda \end{cases}$$

gives satisfactory behavior from zero speed to very high speeds. Parameters $\lambda'$ and $\omega_{s0}$ are positive constants. The parameter can be considered as an impedance, which may be helpful when choosing $\lambda'$ for different motor sizes. In the specification, the observer gain is determined by $\lambda'=1$ p.u.

Speed-Adaptation Laws

Prior Art

The conventional speed-adaptation law is $$\hat{\omega}_m = -\gamma_p \text{Im}\{(\underline{i}_s - \hat{\underline{i}}_s)\hat{\underline{\psi}}^*_R\} - \gamma_i \int \text{Im}\{(\underline{i}_s - \hat{\underline{i}}_s)\hat{\underline{\psi}}^*_R\} dt \quad (5)$$

where $\gamma_p$ and $\gamma_i$ are the adaptation gains. Only the current estimation error perpendicular to the estimated rotor flux is used to estimate the speed. The adaptation law works well except in the regenerating mode at low speeds. The gains $\gamma_p=10$ (Nm·s)$^{-1}$ and $\gamma_i=10000$ (Nm·s$^2$)$^{-1}$ are used in this specification.

According to the Present Invention

The speed-adaptation law according to the present invention is $$\hat{\omega}_m = -\gamma_p \text{Im}\{(\underline{i}_s - \hat{\underline{i}}_s)\hat{\underline{\psi}}^*_R e^{-j\phi}\} - \gamma_i \int \text{Im}\{(\underline{i}_s - \hat{\underline{i}}_s)\hat{\underline{\psi}}^*_R e^{-j\phi}\} dt \quad (6)$$

where the angle $\phi$ changes the direction of the error projection. In other words, the component of the current estimation error parallel to the estimated rotor flux is also exploited when $\phi \neq 0$. The change in the direction of the error projection is needed to stabilize the regenerating-mode operation at low speeds. Equation (6) is simple to calculate since Im$\{\underline{a} \ \underline{b}^*\}$ can be interpreted as the cross product of the vectors. In the case of (6) the cross product is calculated between stator current estimation error and estimated rotor flux.

In the speed adaptation the estimated rotor flux linkage is used. The method is also applicable for estimating stator flux linkage. This allows the method to be used in a wide variety of vector control methods.

Steady-State Analysis

Based on (1) and (3), the estimation error $\underline{e} = \underline{X} - \hat{\underline{X}}$ of the state vector and the stator current error are $$\dot{\underline{e}} = (A - LC)\underline{e} + \begin{bmatrix} 0 \\ j\hat{\underline{\psi}}_R \end{bmatrix}(\omega_m - \hat{\omega}_m) \quad (7a)$$

$$\underline{i}_s - \hat{\underline{i}}_s = C\underline{e} \quad (7b)$$

In the following, the estimation error $\underline{e}$ is considered in the steady state and the estimated rotor flux reference frame is used, i.e., $\underline{\dot{e}}=0$, $\omega_k = \omega_s$ (where $\omega_s$ is the angular stator frequency), and $\hat{\underline{\psi}}_R = \hat{\psi}_R + j0$. For a given error $\omega_m - \hat{\omega}_m$, and an operating point determined by the angular stator frequency $\omega_s$, the angular slip frequency $\omega_r = \omega_s - \omega_m$, and the rotor flux estimate $\hat{\psi}_R$, a steady-state solution for (7) can be easily found.

Stable Region

FIG. 1 depicts the loci of current estimation error for two different speed estimation errors when the angular slip frequency $\omega_r$ varies from the negative rated slip to the positive rated slip. The angular stator frequency is $\omega_s=0.1$ p.u. and the base value of the angular frequency is $2\pi 50 \text{ s}^{-1}$. It can be seen that the larger the speed error, the larger the current estimation error.

FIG. 1 shows the loci of the current estimation error when the angular slip frequency $\omega_r$ varies from the negative rated slip to the positive rated slip (the rated slip being 0.05 p.u.). The angular stator frequency is $\omega_s=0.1$ p.u. and two different speed estimation errors (0.002 p.u. and 0.004 p.u.) are shown. The estimated rotor flux reference frame is used in FIG. 1.

In FIG. 1, $\omega_s>0$ and $\hat{\omega}_m>\omega_m$. If $\omega_s<0$, the loci lie in the right half-plane. If $\hat{\omega}_m<\omega_m$, the loci are located in the lower half-plane.

In the estimated rotor flux reference frame, the prior art adaptation law (5) reduces to $$\hat{\omega}_m = -\gamma_p (i_{sq} - \hat{i}_{sq})\hat{\psi}_R - \gamma_i \int (i_{sq} - \hat{i}_{sq})\hat{\psi}_R dt \quad (8)$$

The speed estimate thus depends on the error $i_{sq} - \hat{i}_{sq}$. If $\hat{\omega}_m > \omega_m$, the condition $i_{sq} - \hat{i}_{sq} > 0$ should hold in order the speed estimate to converge. In FIG. 1, this condition holds for all slip frequencies including the regenerating-mode operation (where $\omega_s \omega_r < 0$).

Unstable Region

Figure 2:
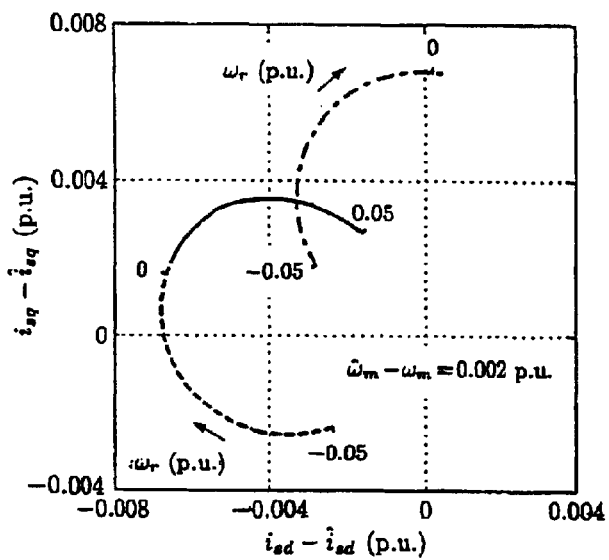

FIG. 2 shows loci of the current estimation error for a lower angular stator frequency $\omega_s=0.01$ p.u. The locus consisting of the solid curve and the dashed curve shows the current estimation error. The condition $i_{sq} - \hat{i}_{sq} > 0$ holds in the motoring-mode operation, but in the regenerating-mode operation at higher slips, it does not hold. Hence, the observer using the prior art adaptation law becomes unstable.

FIG. 2 shows loci of the current estimation error when the angular slip frequency $\omega_r$ varies from the negative rated slip to the positive rated slip. The angular stator frequency is $\omega_s=0.01$ p.u. and the speed estimation error is $\hat{\omega}_m-\omega_m=0.002$ p.u. The dashed/solid curve shows the locus corresponding to the prior art adaptation law. The locus consisting of the solid curve and the dash-dotted curve corresponds to the adaptation law as used in connection with the present invention. In FIG. 2 the estimated rotor flux reference frame is used.

Based on FIG. 2, it can be noticed that the regenerating mode can be stabilized by changing the direction of the error projection. Consequently, the adaptation law (6) according to the method of the invention in the estimated rotor flux reference frame is considered. The current estimation error is rotated by factor $\exp(-j\phi)$ in the estimated flux reference frame. Since the prior art adaptation law works well in the motoring mode, the angle $\phi$ is selected as $$\phi = \begin{cases} \phi_{\max} \text{sgn}(\omega_s)\left(1-\frac{|\omega_s|}{\omega_\phi}\right) & \text{if } |\omega_s|<\omega_\phi \text{ and } \omega_s\hat{\omega}_r<0 \\ 0 & \text{otherwise} \end{cases} \quad (9)$$

For the given motor, $\phi_{\max}=0.44\pi$ (i.e., 80°) and $\omega_\phi=0.4$ p.u. were chosen. In FIG. 2, the current error locus resulting from (9) consists of the solid curve and the dash-dotted curve, i.e., the dashed curve was rotated 78° around the origin in order to obtain the dash-dotted curve. Now, the condition $i_{sq}-\hat{i}_{sq}>0$ is valid for all slip frequencies. Actually, the selection (9) stabilizes the whole regenerating region. The parameters $\phi_{\max}$ and $\omega_\phi$ can be substantially varied without losing the stability.

The adaptation law according to the inventive method is not restricted to the observer gain (4). Several observer gains were studied using the steady-state analysis and the linearized model. Even the same values of $\phi_{\max}$ and $\omega_\phi$ as with the observer gain (4) can be used in some cases, e.g., when using the observer gain proposed in or the zero observer gain.

Linearized Model

The nonlinear and complicated dynamics of the speed-adaptive observer can be studied via linearization. The key factor in the linearization is to use a synchronous reference frame in order to obtain a dc equilibrium point. In the following, the dynamics of both the motor and the observer are taken into account. Even though the stator dynamics are included in the model, the linearized model is independent of the stator voltage and, consequently, of the current controller.

Estimation Error

In the rotor flux reference frame, the linearized model of (7a) becomes [11]

$$\dot{\underline{e}} = (\underline{A}_0 - \underline{L}_0 \underline{C})\underline{e} + \begin{bmatrix} 0 \\ j\psi_{R0} \end{bmatrix}(\omega_m - \hat{\omega}_m) \quad (10a)$$

Here, the equilibrium point quantities are marked by the subscript 0, and the system matrix and the observer gain are $$\underline{A}_0 = \begin{bmatrix} -\frac{1}{\tau'_s} - j\omega_{s0} & \frac{1}{\tau'_s} \\ \frac{1-\sigma}{\tau'_r} & -\frac{1}{\tau'_r} - j\omega_{r0} \end{bmatrix}, \underline{L}_0 = \begin{bmatrix} l_{s0} \\ l_{r0} \end{bmatrix} \quad (10b)$$

respectively.

The transfer function from the estimation error of the speed $\omega_m-\hat{\omega}_m$ to the estimation error of the current $\underline{i}_s-\hat{\underline{i}}_s$ is $$\underline{G}(s) = \underline{C}(s\underline{I} - \underline{A}_0 + \underline{L}_0\underline{C})^{-1} \begin{bmatrix} 0 \\ j\psi_{R0} \end{bmatrix} \quad (11a)$$

$$= -\frac{-j\psi_{R0}}{L'_s} \frac{s+j\omega_{s0}}{A(s)+jB(s)}$$

where $$\underline{I} = \begin{bmatrix} 1 & 0 \\ 0 & 1 \end{bmatrix}$$

is the identity matrix. The polynomials in (11a) are defined as $$A(s) = s^2 + s\left(\frac{1}{\tau'_s} + \frac{1}{\tau'_r} + \frac{l_{sd0}-l_{rd0}}{L'_s}\right) - \quad (11b)$$

$$\omega_{s0}\omega_{r0} + \frac{\sigma}{\tau'_s\tau'_r} + \frac{\omega_{s0}l_{rq0}-\omega_{r0}l_{sq0}}{L'_s} + \frac{\sigma l_{sd0}}{\tau'_r L'_s}$$

$$B(s) = s\left(\omega_{s0} + \omega_{r0} + \frac{l_{sq0}-l_{rq0}}{L'_s}\right) + \quad (11c)$$

$$\frac{\omega_{s0}\tau'_s + \omega_{r0}\tau'_r}{\tau'_s\tau'_r} + \frac{\omega_{r0}l_{sd0}-\omega_{s0}l_{rd0}}{L'_s} + \frac{\sigma l_{sq0}}{\tau'_r L'_s}$$

where the entries of the observer gain are divided into real and imaginary components: $\underline{l}_{s0}=l_{sd0}+jl_{sq0}$ and $\underline{l}_{r0}=l_{rd0}+jl_{rq0}$. Since the observer gain is allowed to be a function of the estimated rotor speed, the subscript 0 is used. It is to be noted that $\underline{G}(s)$ is independent of the speed-adaptation law.

Closed-Loop System

Prior Art Adaptation Law

Based on the conventional adaptation law (8), the linearized transfer function from the current error $\underline{i}_{sq}-\hat{i}_{sq}$ to the speed estimate $\hat{\omega}_m$ is $$K(s) = -\left(\gamma_{p0} + \frac{\gamma_{i0}}{s}\right)\psi_{R0} \quad (12)$$

where the gains can be functions of the speed estimate. Only the imaginary component $\underline{i}_{sq}-\hat{i}_{sq}$ of the estimation error of the current is of interest. Thus only the imaginary component of (11a) is used, $$G_q(s) = \text{Im}\{\underline{G}(s)\} = -\frac{\psi_{R0}}{L'_s} \frac{sA(s)+\omega_{s0}B(s)}{A^2(s)+B^2(s)} \quad (13)$$

Figure 3A:
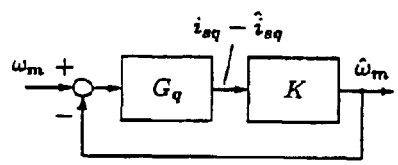
FIG. 3a illustrates the linearized model of the observer using the prior art speed-adaptation law.

Using (12) and (13), the closed-loop system shown in FIG. 3(a) is formed. The closed-loop transfer function corresponding to any operating point can be easily calculated using suitable computer software (e.g., MATLAB Control System Toolbox).

Figure 4A:
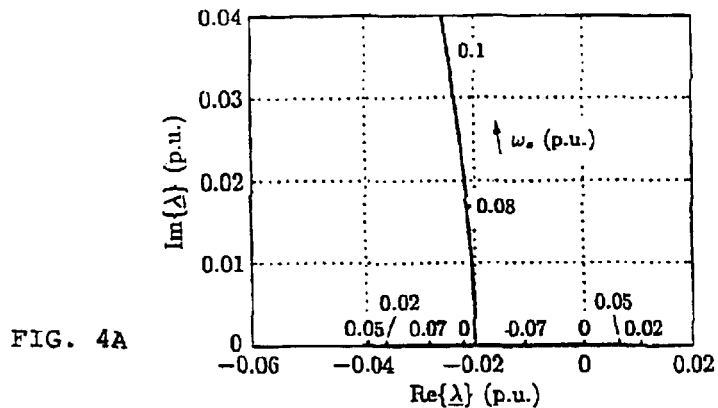
FIG. 4a shows a part of the root loci of the prior art speed adaptation law.

FIG. 4(a) shows the root loci of the linearized closed-loop system corresponding to the regenerating-mode operation. The slip frequency is rated and negative. Only the dominant poles are shown. As assumed, the system is unstable at low stator frequencies (a real pole is located in the right half-plane).

Adaptation Law According to the Invention

In the estimated rotor flux reference frame, the inventive adaptation law (6) becomes $$\hat{\omega}_m = -\gamma_p\lfloor(i_{sq}-\hat{i}_{sq})\cos(\phi)-(i_{sd}-\hat{i}_{sd})\sin(\phi)\rfloor\hat{\psi}_R - \gamma_i\int[(i_{sq}-\hat{i}_{sq})\cos(\phi)-(i_{sd}-\hat{i}_{sd})\sin(\phi)]\hat{\psi}_R dt \quad (14)$$

Figure 3B:
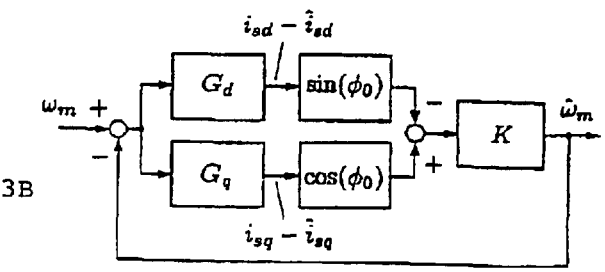
FIG. 3b illustrates the linearized model of the observer using the speed adaptation law according to the invention.

The linearized system is shown in FIG. 3(b), where the transfer function from the estimation error of the speed, $\omega_m - \hat{\omega}_m$ to the estimation error of the current $\underline{i}_{sd} - \hat{\underline{i}}_{sd}$ is $$G_d(s) = \text{Re}\{\underline{G}(s)\} = -\frac{\psi_{R0}}{L'_s} \frac{sB(s) - \omega_{s0}A(s)}{A^2(s) + B^2(s)} \quad (15)$$

Figure 4B:
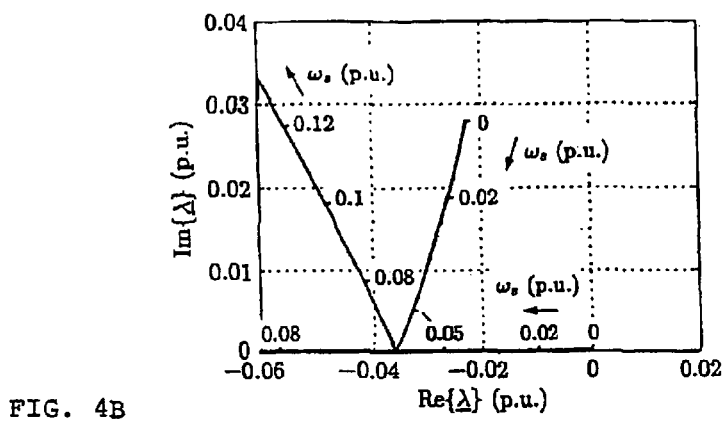
FIG. 4b shows a part of the root loci of the inventive speed adaptation law.

FIG. 4(b) shows the root loci of the linearized closed-loop system corresponding to the regenerating-mode operation. In this case, the system is stable also at low stator frequencies (marginally stable when the stator frequency is zero).

FIGS. 4(a) and 4(b) show part of the root loci showing the dominant poles in the regenerating mode. The slip frequency is rated and negative. Due to symmetry, only the upper half-plane is shown in the FIGS. 4(a) and 4(b).

Control System

Figure 5:
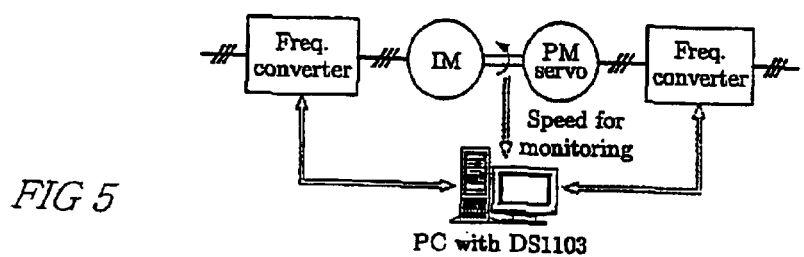
FIG. 5 illustrates the experimental setup.

The regenerating-mode low-speed operation of the speed-adaptive observer was investigated by means of simulations and experiments. The MATLAB/Simulink environment was used for the simulations. The experimental setup is shown in FIG. 5. The 2.2-kW four-pole induction motor (Table I) was fed by a frequency converter controlled by a dSpace DS1103 PPC/DSP board. The PM servo motor was used as the loading machine.

Figure 6:
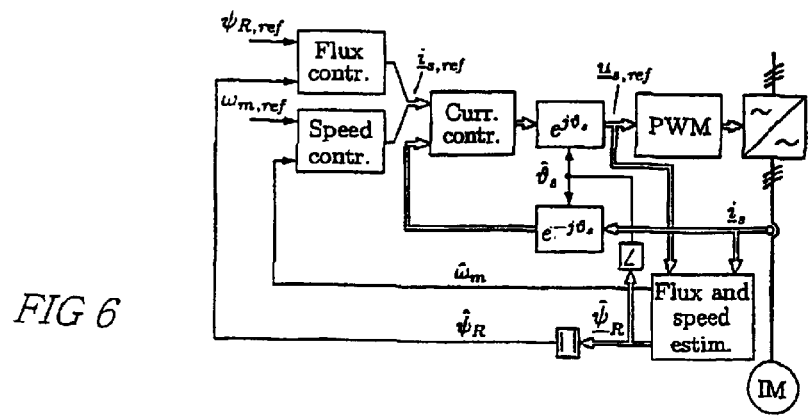
FIG. 6 illustrates a rotor-flux-oriented controller.

The control system was based on the rotor flux orientation. The simplified overall block diagram of the system is shown in FIG. 6, where the electrical variables on the left-hand side of the coordinate transformations are in the estimated flux reference frame and the variables on the right-hand side are in the stator reference frame. The digital implementation of the observer proposed in [10] was used. The flux reference was 0.9 Wb.

A PI-type synchronous-frame current controller was used. The bandwidth of the current controller was 8 p.u. The speed estimate was filtered using a first-order low-pass filter having the bandwidth of 0.8 p.u, and the speed controller was a conventional PI-controller having the bandwidth of 0.16 p.u. The flux controller was a PI-type controller having the bandwidth of 0.016 p.u.

The sampling was synchronized to the modulation and both the switching frequency and the sampling frequency were 5 kHz. The dc-link voltage was measured, and the reference voltage obtained from the current controller was used for the flux observer. A simple current feedforward compensation for dead times and power device voltage drops was applied.

It is also understood that the experimental setup is illustrated here only for an example. The control system using the method of the invention can be any known system and is not limited to the mentioned rotor-flux-oriented system.

Results

Figure 7A:
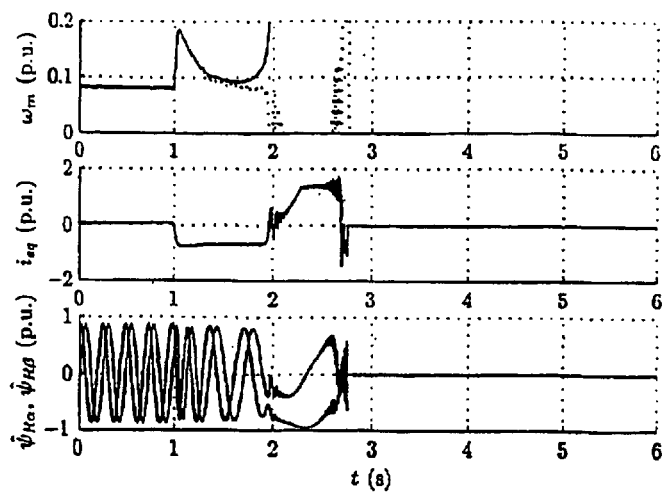
FIGS. 7a–b and 8 illustrate experimental results in the regenerating mode.
Figure 7B:
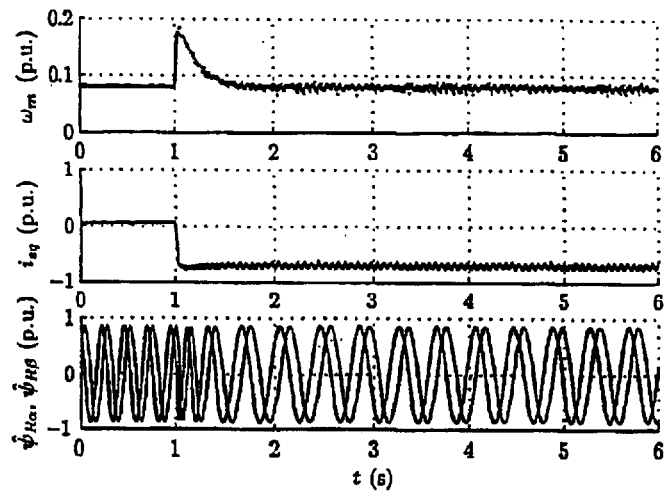

The base values used in the following figures are: current $\sqrt{2} \cdot 5.0$ A and flux 1.0 Wb. Experimental results obtained using the prior art adaptation law are shown in FIG. 7(a). The speed reference was set to 0.08 p.u. and a negative rated-load torque step was applied at t=1 s. After applying the negative load, the drive should operate in the regenerating mode. However, the system becomes unstable soon after the torque step. According to the root loci of FIG. 4(a), the operating point is unstable since the stator frequency is approximately 0.05 p.u. FIG. 7(b) depicts experimental results obtained using the adaptation law according to the invention. As expected based on the root loci of FIG. 4(b), the system behaves stably.

The first subplot of FIGS. 7(a) and 7(b) shows the measured speed (solid) and the estimated speed (dotted). The second subplot shows the q component of the stator current in the estimated flux reference frame. The third subplot presents the real and imaginary components of the estimated rotor flux in the stator reference frame.

Figure 8:
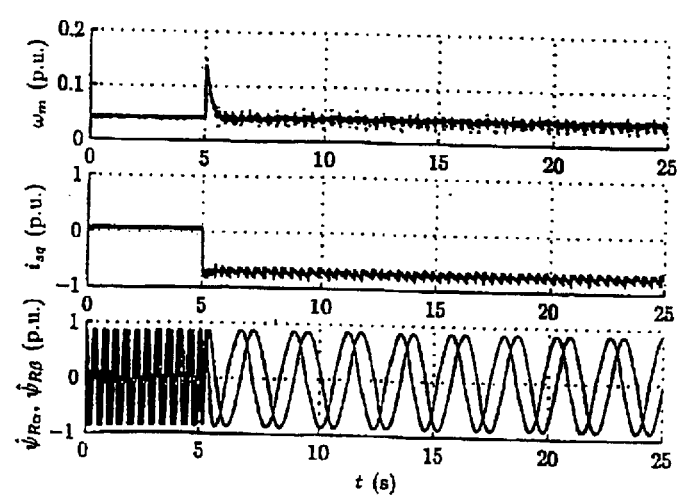

FIG. 8 shows experiment results obtained using the adaptation law according to the invention. The speed reference was now set to 0.04 p.u. and the negative rated-load torque step was applied at t=5 s. Even though the stator frequency is only about 0.0085 p.u., both the flux and speed are correctly observed. The explanation of curves are as in FIG. 7.

Figure 9A:
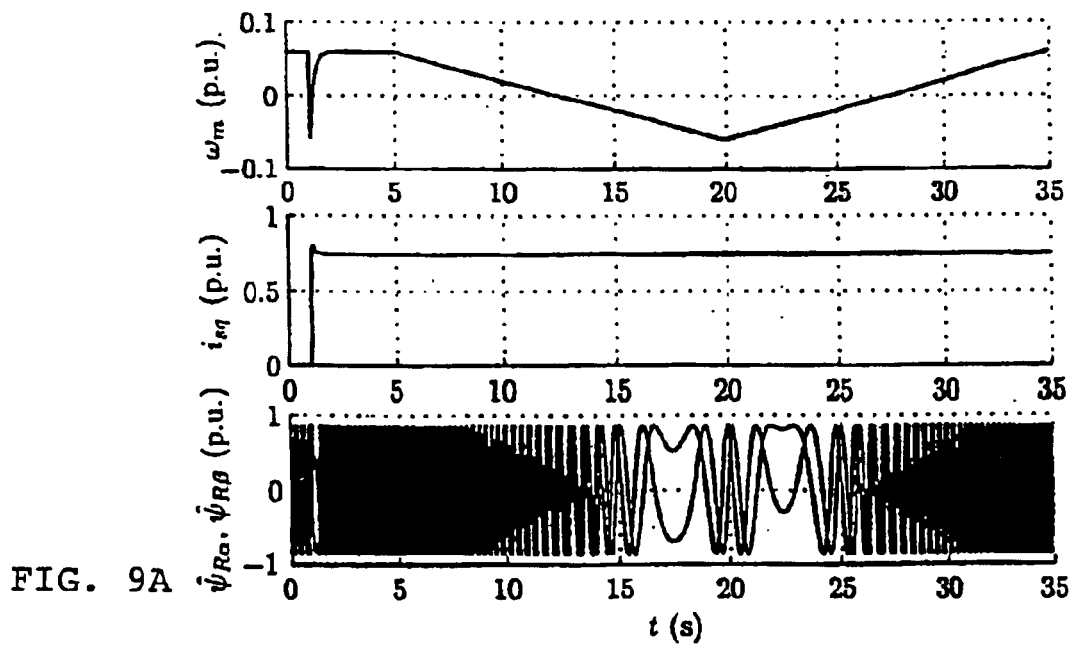
FIG. 9a illustrates simulation results.

Simulation results showing slow speed reversals are shown in FIG. 9(a). The adaptation law according to the invention was used. A rated-load torque step was applied at t=1 s. The speed reference was slowly ramped from 0.06 p.u. (t=5 s) to −0.06 p.u. (t=20 s) and then back to 0.06 p.u. (t=35 s). The drive operates first in the motoring mode, then in the regenerating mode, and finally again in the motoring mode.

Figure 9B:
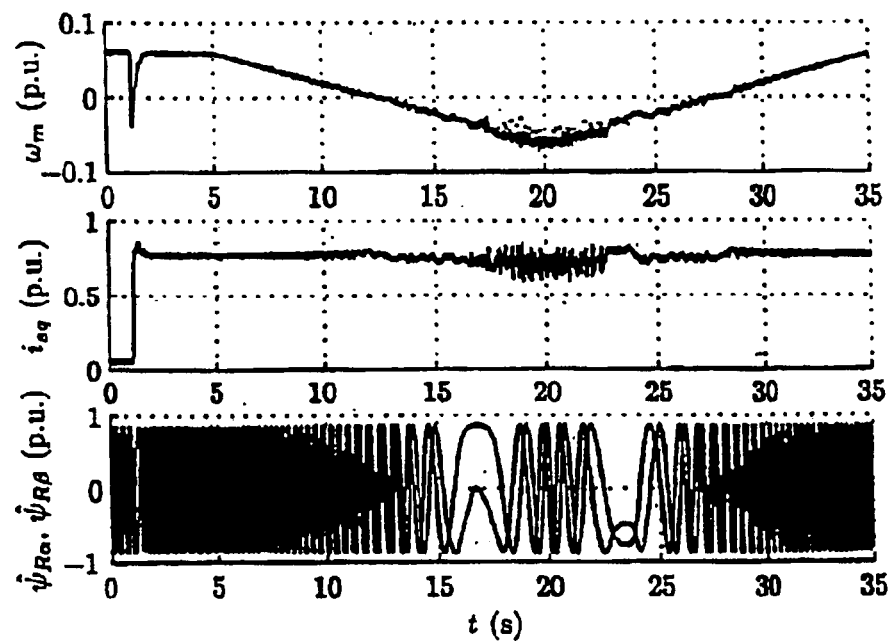
FIG. 9b illustrates experimental results.

Corresponding experimental results are shown in FIG. 9(b). The noise in the current and the speed estimate originates mainly from the incomplete dead-time compensation. At a given speed, the proportional effect of the dead-time compensation is more significant in the regenerating mode than in the motoring mode since the amplitude of the stator voltage is smaller. This kind of speed reversals require a very accurate stator resistance estimate since the stator frequency remains in the vicinity of zero for a long time. If desired, the observer could be augmented with a stator resistance adaptation scheme, Experimental results in the motoring-mode operation (demonstrating e.g. zero-speed operation) of the same speed-adaptive observer can be found in. The explanations of the curves are as in FIG. 7.

It will be obvious to a person skilled in the art that, as technology advances, the inventive concept can be implemented in various ways. The invention and its embodiments are not limited to the examples described above but may vary within the scope of the claims.

TABLE I

PARAMETERS OF THE 2.2-KW FOUR-POLE 400-V 50-Hz MOTOR.

| | |
|---|---|
| Stator resistance $R_s$ | 3.67 Ω |
| Rotor resistance $R_R$ | 2.10 Ω |
| Magnetizing inductance $L_M$ | 0.224 H |
| Stator transient inductance L's | 0.0209 H |
| Moment of inertia Jtot | 0.0155 kgm$^2$ |
| Rated speed | 1430 rpm |
| Rated current | 5.0 A |
| Rated torque | 14.6 Nm |

What is claimed is:

1. A method for the stabilization of full-order flux observers for speed-sensorless induction motors in the regenerative mode, characterized by determining a current vector of the induction motor, determining a stator voltage vector of the induction motor, forming a full-order flux observer having a system matrix (A) and gain matrix (L), the state-variable observer being augmented with a speed adaptation loop, and producing an estimated rotor flux linkage vector and an estimated stator current vector, determining an estimation error of the stator current vector, defining a correction angle, and forming a speed adaptation law based on the cross product of the estimation error of the stator current vector and the estimated rotor flux linkage vector, where the correction angle is used to turn the rotor flux linkage vector or the estimation error of the stator current vector in order to keep the observer stable.

2. A method according to claim 1, characterized in that the method further comprises controlling the speed-sensorless induction motor with the information received from the full-order flux observer, the information comprising the stator or rotor flux linkage vector and the angular speed of the motor.

* * * * *